United States Patent [19]

Kitano

[11] Patent Number: 5,397,229

[45] Date of Patent: Mar. 14, 1995

[54] ELECTROFORMED TOOLING WITH HEAT TRANSFER FINS AND METHOD FOR MAKING SAME

[75] Inventor: Minoru Kitano, Nagoga, Japan

[73] Assignee: FET Engineering, Inc., Bardstown, Ky.

[21] Appl. No.: 179,977

[22] Filed: Jan. 11, 1994

[51] Int. Cl.⁶ .................. B23K 31/00; B29C 41/04
[52] U.S. Cl. .................. 425/425; 228/173.3; 228/173.6; 249/80; 249/137; 264/219; 425/435
[58] Field of Search .................. 228/165, 170, 173.3, 228/173.6, 185; 219/75, 137 R, 137 PS; 249/79, 80, 137, 135; 425/425, 435, DIG. 110, DIG. 246, ; 264/219, 310, 311, DIG. 60

[56] References Cited

U.S. PATENT DOCUMENTS

| | | | |
|---|---|---|---|
| 1,523,021 | 1/1925 | Ladd | 249/137 |
| 1,754,721 | 4/1930 | Linden | 228/165 |
| 2,370,953 | 3/1945 | Greenberg | 425/425 |
| 2,396,795 | 3/1946 | Lea | 228/173.6 |
| 3,155,479 | 11/1964 | Zimmerman | 425/425 |
| 3,768,948 | 10/1973 | Horberg, Jr. et al. | 425/526 |
| 4,714,424 | 12/1987 | Kinugasa et al. | 264/571 |
| 5,032,076 | 7/1991 | Jackson, Jr. | 425/435 |

FOREIGN PATENT DOCUMENTS

| | | | |
|---|---|---|---|
| 62-62717 | 3/1987 | Japan | 425/425 |
| 487769 | 2/1976 | U.S.S.R. | 425/435 |
| 543522 | 3/1977 | U.S.S.R. | 425/435 |

Primary Examiner—Jay H. Woo
Assistant Examiner—Robert B. Davis
Attorney, Agent, or Firm—Allegretti & Witcoff, Ltd.

[57] ABSTRACT

A mold assembly for molding thermoplastic material into a solid thin shell includes a metal mold with an outer surface exposed to a heat source and an inner surface on which thermoplastic material is cast and fused to form a thin layer thermoplastic shell. A plurality of elongated generally planar fins are connected to the outer surface at predetermined spaced areas for transferring heat from the heat source to predetermined spaced areas of the inner surface. The fins are metal sheets, preferably copper, each having a discontinuous flange at one end secured to the outer surface at spaced points along the discontinuous flange. The discontinuous flange is formed by slitting or cutting one end to form spaced projections and then bending adjacent projections in opposite directions generally transversely from the elongated metal sheet. The projections arc secured to the outer surface by TIG welding.

6 Claims, 1 Drawing Sheet

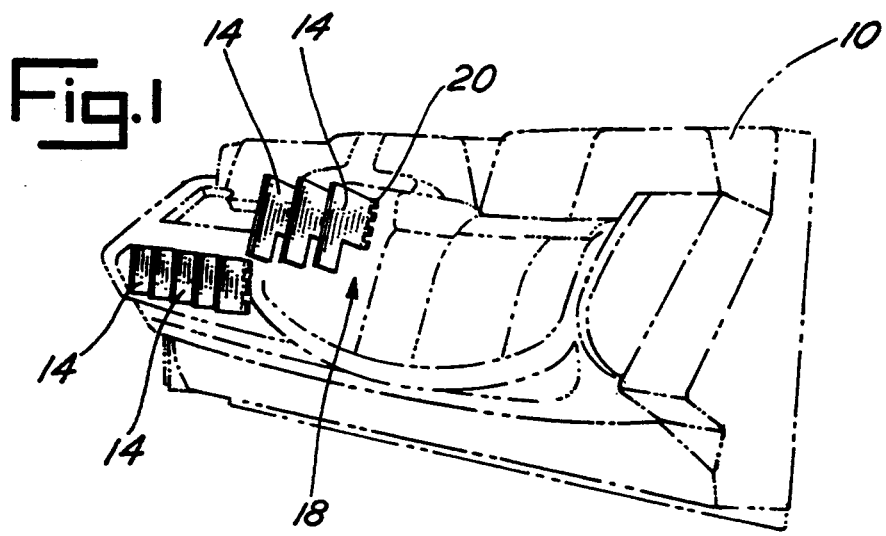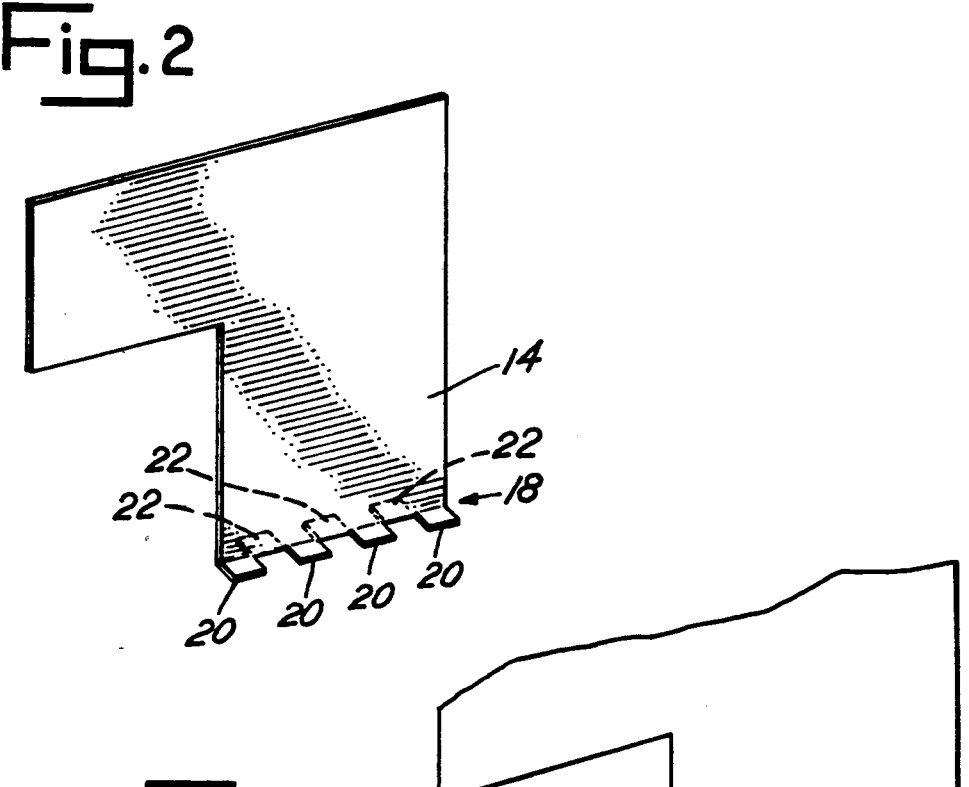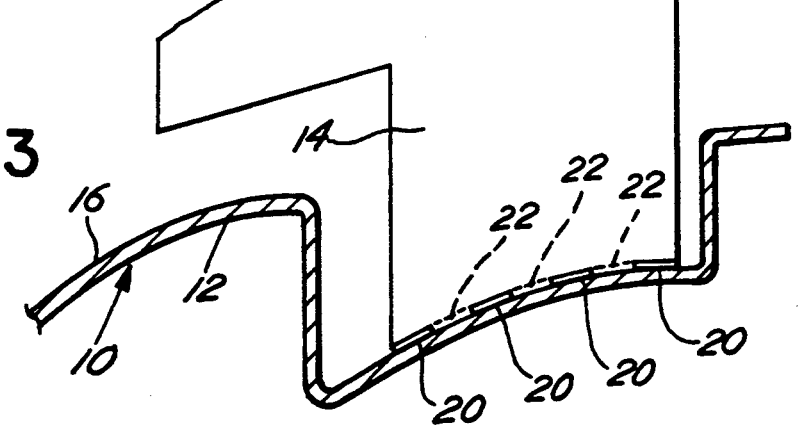

ELECTROFORMED TOOLING WITH HEAT TRANSFER FINS AND METHOD FOR MAKING SAME

FIELD OF THE INVENTION

This invention relates to molding apparatus and more particularly, to a metal shell mold having an outer surface exposed to a heat source and an inner surface on which thermoplastic material is cast and fused to form a thin layer thermoplastic shell and a plurality of elongated fins secured to the shell mold by a discontinuous flange at spaced points for transferring heat from the heat source to predetermined areas of the inner surface of the shell mold without distortion of the metal shell mold and without causing thermal cracks in the metal shell mold.

BACKGROUND OF THE INVENTION

Electroforming is a method of making a metal casting of any shape by electroplating rather than traditional machinery. The electroformed process can achieve precision reproduction of complicated shapes and textures, e.g., leather or wood graining. It is known to cast thermoplastic material such as polyvinyl chloride on the inner surface of a thin metal mold member heated to the fusion temperature of the deposited thermoplastic material to form a gel coat which is cured to form a relatively thin plastic shell suitable for use as an outer skin or shell covering on interior products for vehicles, such as door panels, and dash board panels, and on exterior products for vehicles, such as moldings or bumper fascias.

One known method of heating the metal mold member was to direct hot gas over the exterior surface of the heated mold to transfer heat onto the metal of the mold for transfer therethrough into the thermoplastic material (sometimes referred to a plastisol material) to cause the plastisol material, which might be either wet or dry, to gel and cure. In the gel stage, the plastisol material is fused together into a thin layer of material. Thereafter, the fused material is cured at an elevated temperature to form a finished products with desired physical properties.

U.S. Pat. No. 5,032,076 notes that there were attempts to improve the heat transfer rate for directing heat from the heat source to the deposited plastisol material by providing fins on the outer surface of the mold and flowing heated air across the fins, however, past practices of welding or brazing the fins to the mold caused distortion or thermal cracks in the mold during fabrication. An additional problem with known practices of securing fins to the mold was degradation of the properties of the metal in the vicinity of the connection, which could cause grain growth to the metal mold that made it more susceptible to cracking.

A solution to the problem of connecting fins to the mold proposed in U.S. Pat. No. 5,032,076 was to apply a plurality of heat transfer pins, each having an enlarged head juxtaposed against the outer surface of the thin metal mold and connected thereto by a capacitive weld joint.

The present invention provides a solution to the problem of connecting elongated heat transfer fins to the outer surface of a metal mold, without causing any of the problems of mold distortion or thermal cracks noted above.

An object of this invention is to provide an improved mold assembly for molding thermoplastic material having a plurality of elongated heat transfer fins affixed to the outer surface of the shell mold for transferring heat from a heat source to predetermined areas of the inner surface of the shell mold, said fins being connected to the outer surface, without causing distortion or cracking of the mold.

Another object of the present invention is to provide an improved method of fabricating a mold assembly for molding thermoplastic material by forming a plurality of fins each comprising an elongated metal sheet having a discontinuous flange and connecting the discontinuous flange to the shell mold by TIG welding at spaced points.

Other objects and advantages of the present invention will be made more apparent hereafter.

SUMMARY OF THE INVENTION

A feature of the present invention is to provide a mold assembly having a mold with heat transfer fins, each of which includes a discontinuous flange that is connected to the mold at spaced points by TIG welding without distortion or cracking of the mold.

Another feature of the present invention is to provide a mold assembly with elongated fins for transferring heat from a heat source to the inner surface of the mold, the elongated fins being made from copper and each being formed with a discontinuous flange made by slitting or cutting an end of the fin to form projections and bending adjacent projections transversely in opposite directions.

Yet another feature of the present invention is to provide a novel method of making a mold assembly with elongated fins comprising forming a discontinuous flange on each fin by slitting one side of the fin to form adjacent projections and bending adjacent projections transversely of the fin in opposite directions and connecting the projections at spaced points to the mold by TIG welding.

BRIEF DESCRIPTION OF THE DRAWING

There is shown in the drawing a presently preferred embodiment of the present invention, wherein like numerals refer to like elements in the various views and wherein:

FIG. 1 is a perspective view of a shell mold illustrating a number of elongated heat transfer fins of the present invention connected to the outer surface of the shell mold.

FIG. 2 is a perspective view of a representative elongated heat transfer fin of the present invention having a discontinuous flange; and FIG. 3 is a detail side view illustrating the connection of a representative elongated heat transfer fin to the outer surface of the mold.

DESCRIPTION OF THE PREFERRED EMBODIMENT

Turning to FIG. 1 there is shown a metal shell mold 10 as used in a molding assembly for molding thermoplastic material. The molding assembly may be of a known type (for example, as shown diagrammatically in FIG. 1 of U.S. Pat. No. 5,032,076) that includes a base having spaced trunnion arms for rotatably supporting mold support. The trunnion arms define an axis about which the shell mold 10 is rotated for casting thermoplastic material from a powder box connected to the shell mold. A mold support encompasses the shell mold and is spaced therefrom so as to define a cavity. The cavity may be operatively connected to a heat source or to a cooling source.

The thermoplastic material is distributed from the powder box in a dry form. If desired, a charge of liquid thermoplastic material could be used.

The mold shell 10 has an inner surface 12 against which the thermoplastic material is cast. The thermoplastic material is a suitable resin such as particles of polyvinyl chloride having a core of resin with a suitable plasticizer and having an outer surface of color pigment material thereon.

In order to gel and cure such material, it is necessary to provide an efficient transfer of heat from the gas flow through the cavity into the shell mold, then through the thickness of the metal in the mold and into the thermoplastic material deposited on the inner surface 12 of the mold shell 10.

A plurality of elongated generally planer heat transfer fins 14 arc connected to the exterior surface or outer surface 16 of the mold 10 to enhance heat transfer from the hot (or cool) gas flow in the cavity between the mold support (not shown) and the mold 10. The heat transfer fins 14 arc connected to the outer surface 16 of the mold 10 in a unique fashion by a discontinuous flange means 18 without distortion or cracking of the mold.

As better shown in FIGS. 2 and 3, the discontinuous flange means 18 is comprised of a plurality of projections 20 and 22 that arc bent transversely from the plane of the elongated metal sheet comprising each fin 14. The discontinuous flange mans 18 may be formed by slitting or cutting a side of the elongated fin 14 equidistantly along the side to form the adjacent projections 20, 22 of generally equal width. Adjacent projections are bent transversely and in opposite directions from one another. Thus, as shown, the projections 20 are bent in one direction and the projections 22 are bent in an opposite direction. The projections 20, 22 are bent at appropriate angles (generally right angles) so as to support the associated elongated fin at right angles to the outer surface of mold 10.

Each projection 20, 22 is welded to the outer surface 16 of the mold shell 10 by gas-tungsten arc welding. In the gas-tungsten arc welding process, often called the tungsten inert-gas or TIG process, the electrode is nonconsumable and shielding is provided by the flow of inert gas through the welding torch nozzle. Argon and helium are commonly used, as well as argon-helium mixtures. Best results to date have been employed by fabricating the heat transfer fins 14 from copper (110 ALOY) that is ⅛ inch thick and by utilizing a TIG welder at 125 amps with a 5/16 inch tungsten tip and a copper TIG rod. Welding is accomplished at spaced points along the continuous flange means 18. Basically, welding of the projections 20, 22 to the outer surface 16 of the mold 10 at spaced apart points as described has been found to disperse the welding heat as compared to a single continuous weld and results in no distortion or cracking of the mold 10.

By forming a discontinuous flange 18 as best shown in FIG. 2 and welding the projections 20, 22 to the outer surface of the mold shell 10 by means of the TIG process described at spaced points, there has been provided a mold that has heat transfer fins joined thereto, without distortion or cracking of the metal shell mold (which is generally formed from zinc).

There has been provided by the present invention an improved shell mold having affixed on the outer surface heat transfer fins for increasing the heat transfer area for flow of heat from the heat source to the thermoplastic material adjacent the inner surface of the mold. The elongated heat transfer fins are formed at one end with a discontinuous flange means comprising a plurality of oppositely bent adjacent projections that are each TIG welded to the outer surface of the mold shell. This is accomplished without distortion or cracking of the mold and without deleterious degradation of the properties of the metal in the vicinity of the welds.

While I have shown and described a presently preferred embodiment of the present invention, it will be understood that modifications and variations are possible in light of the teachings herein without departing from the scope of the appended claims.

I claim:

1. In a mold assembly for molding thermoplastic material into a solid thin shell, said assembly having a metal mold with an outer surface adapted to be exposed to a heat source and an inner surface on which thermoplastic material is cast and fused to form a thin layer thermoplastic shell, the improvement comprising a plurality of fins connected to the outer surface of the mold, each fin comprising an elongated metal sheet having a discontinuous flange at one end secured to the outer surface at spaced points along the discontinuous flange, said fins transferring heat from the heat source to predetermined areas of the inner surface.

2. A mold assembly as in claim 1 wherein the discontinuous flange comprises a plurality of spaced projections extending transversely from the elongated metal sheet.

3. A mold assembly as in claim 2 wherein the elongated metal sheet is made from copper.

4. A method of fabricating a mold assembly for molding thermoplastic material into a solid thin shell, said assembly having a metal mold with an outer surface adapted to be exposed to a heat source and an inner surface on which thermoplastic material is cast and fused to form a thin thermoplastic shell comprising the step of forming a plurality of fins each comprising an elongated metal sheet with a discontinuous flange at one end and connecting the fins to predetermined areas of said outer surface at spaced points along the discontinuous flange for transferring heat from said heat source to predetermined areas of the inner surface.

5. The method of claim 4 comprising the steps of forming the discontinuous flange by slitting one side of the elongated metal sheet to form projections and bending adjacent projections in opposite directions transversely of the elongated metal sheet.

6. The method of claim 5 comprising the step of connecting the fins to predetermined areas of said outer surface by TIG welding the projections to secure them to the outer surface, without cracking or distortion of the metal mold.

* * * * *